(12) United States Patent
Giloh

(10) Patent No.: US 8,323,764 B2
(45) Date of Patent: Dec. 4, 2012

(54) METHODS TO PRODUCE STRETCHABLE PRODUCTS

(75) Inventor: Ehud Giloh, Manchester (GB)

(73) Assignee: Tamicare Ltd. (GB)

( * ) Notice: Subject to any disclaimer, the term of this patent is extended or adjusted under 35 U.S.C. 154(b) by 159 days.

(21) Appl. No.: 12/875,716

(22) Filed: Sep. 3, 2010

(65) Prior Publication Data
US 2010/0330324 A1 Dec. 30, 2010

Related U.S. Application Data

(63) Continuation of application No. 12/056,040, filed on Mar. 26, 2008, now Pat. No. 7,901,740, which is a continuation-in-part of application No. 11/268,684, filed on Nov. 7, 2005, now Pat. No. 7,767,133.

(60) Provisional application No. 60/625,480, filed on Nov. 5, 2004.

(51) Int. Cl.
*B32B 3/10* (2006.01)
*B32B 3/14* (2006.01)

(52) U.S. Cl. .......................... 428/90; 428/95

(58) Field of Classification Search ............ 428/90, 428/131, 137, 195.1, 295.1, 297.4, 95; 427/446, 427/448, 421.1, 427.4, 427.7, 180, 201, 202, 427/203, 206, 256, 258
See application file for complete search history.

(56) References Cited

U.S. PATENT DOCUMENTS

| | | |
|---|---|---|
| 2,527,501 A | 10/1950 | Saks |
| 2,691,611 A | 10/1954 | Saks |
| 3,027,273 A | 3/1962 | Sacks et al. |
| 3,032,774 A | 5/1962 | Wade |
| 3,791,783 A | 2/1974 | Damon et al. |
| 4,095,638 A | 6/1978 | Thompson et al. |
| 4,102,964 A | 7/1978 | Ridgeway |
| 4,223,101 A | 9/1980 | Fine et al. |
| 4,539,396 A | 9/1985 | Yasui et al. |
| 4,623,572 A | 11/1986 | Irrlitz et al. |
| 4,808,458 A | 2/1989 | Watt et al. |
| 5,138,719 A | 8/1992 | Orlianges et al. |
| 5,338,565 A | 8/1994 | Shlenker et al. |
| 5,359,735 A | 11/1994 | Stockwell |
| 5,645,884 A | 7/1997 | Harlow et al. |
| 6,645,884 B1 | 11/2003 | Yang et al. |
| 6,649,116 B2 | 11/2003 | Stephenson et al. |
| 6,699,419 B1 | 3/2004 | Kia et al. |
| 6,890,475 B1 | 5/2005 | Hatjasalo et al. |
| 6,987,210 B1 | 1/2006 | Giloh |

(Continued)

FOREIGN PATENT DOCUMENTS
CH 682288 8/1993
(Continued)

*Primary Examiner* — Cheryl Juska
(74) *Attorney, Agent, or Firm* — McDonnell Boehnen Hulbert & Berghoff LLP

(57) ABSTRACT

The invention provides methods for producing flexible, stretchable, and/or elastic products comprised principally of material such as natural elastomers and other synthetic polymers. The method for producing stretchable products by spraying product material over a workpiece former, and method for creating perforated products by spraying product material over fibers in an upright position. The invention provides methods for making double sided fiber coating of the product and, or to at least coating the product surface on the side facing the wall without the need for removing the product from the wall.

7 Claims, 2 Drawing Sheets

U.S. PATENT DOCUMENTS

| | | |
|---|---|---|
| 7,354,424 B2 | 4/2008 | Giloh |
| 7,767,133 B2 | 8/2010 | Giloh et al. |
| 2003/0197311 A1 | 10/2003 | Stephenson et al. |
| 2004/0091504 A1 | 5/2004 | Hamann |
| 2004/0209062 A1 | 10/2004 | Sebag |
| 2005/0194713 A1 | 9/2005 | Erickson et al. |
| 2005/0222543 A1 | 10/2005 | Shao |
| 2006/0113714 A1 | 6/2006 | Giloh et al. |
| 2006/0165950 A1* | 7/2006 | Dodge ............................. 428/90 |
| 2008/0029788 A1 | 2/2008 | Inoue et al. |
| 2008/0292788 A1 | 11/2008 | Giloh |
| 2009/0035515 A1 | 2/2009 | Cecconi et al. |
| 2009/0221988 A1* | 9/2009 | Ressemann et al. .......... 604/514 |
| 2011/0008478 A1 | 1/2011 | Giloh et al. |

FOREIGN PATENT DOCUMENTS

| | | |
|---|---|---|
| DE | 20 41 764 | 3/1971 |
| EP | 0 128 531 A2 | 12/1984 |
| EP | 0 557 625 B1 | 10/1999 |
| GB | 00509196 A | 8/1938 |
| GB | 00550391 A | 4/1941 |
| GB | 965 901 | 8/1964 |
| GB | 1 209 099 | 10/1970 |
| GB | 1 356 465 | 6/1974 |
| GB | 2 074 085 | 10/1981 |
| GB | 2 265 077 | 9/1993 |
| JP | 54143453 | 11/1979 |
| JP | 60063163 | 4/1985 |
| JP | 61093866 | 5/1986 |
| JP | 63274593 | 11/1988 |
| JP | 03099900 | 4/1991 |
| JP | 04040260 | 2/1992 |
| JP | 4294131 | 10/1992 |
| JP | 5305689 | 11/1993 |
| JP | 07171844 | 7/1995 |
| JP | 8-294930 | 11/1996 |
| JP | 2000-102987 | 4/2000 |
| JP | 2001-505965 | 5/2001 |
| JP | 01271273 | 10/2001 |
| JP | 2002-515356 | 5/2002 |
| JP | 2004-34354 | 2/2004 |
| WO | 92/10119 | 6/1992 |
| WO | 98/25747 | 6/1998 |
| WO | 99/59736 | 11/1999 |
| WO | 00/39215 | 7/2000 |
| WO | 01/58656 A1 | 8/2001 |
| WO | 2004/054775 | 7/2004 |
| WO | 2005/088005 A1 | 9/2005 |
| WO | 2006/092666 A2 | 9/2006 |
| WO | 2009118654 | 10/2009 |

* cited by examiner

METHODS TO PRODUCE STRETCHABLE PRODUCTS

CROSS-REFERENCE

This application is a continuation of U.S. non-provisional application Ser. No. 12/056,040, filed Mar. 26, 2008, now U.S. Pat. No. 7,901,740, issued Mar. 8, 2011, which is a continuation-in-part of U.S. non-provisional application Ser. No. 11/268,684 filed Nov. 7, 2005, now U.S. Pat. No. 7,767,133, issued Aug. 3, 2010, which claims the benefit of U.S. provisional application Ser. No. 60/625,480 filed Nov. 5, 2004, the disclosures of which are incorporated herein by reference in their entirety.

FIELD OF THE INVENTION

The present invention relates to methods for producing products such as two-dimensional and three-dimensional products, composed of flexible, stretchable and/or elastic materials such as natural elastomers and other synthetic polymers. The invention also relates to methods for coating the products with fibres, making perforated stretchable and/elastic products.

BACKGROUND OF THE INVENTION

Methods for making products of natural or artificial latex rubbers are known in the prior art, however the resulting products are merely non-breathable and their feel on the body is rubbery. When loose fibres are applied prior to the application of the product material to create a comfortable tactile feel, the fibres are soaked by the product material making it hard to obtain a even velvet inner fibre coating. Accordingly, there remains a need for an improved methods for producing breathable stretchable products with a desirable tactile feel.

SUMMARY OF THE INVENTION

The present invention is generally related to methods for producing stretchable, elastic or shape-retaining products composed principally of materials such as resilient elastomers including but not limited to natural latex rubber or polyurethane, using controlled spraying of the principal material onto a surface of a wall such as a workpiece former. The resulting product may have a uniform thickness or different thicknesses at different regions as desired. The present invention is also directed to improved methods for preparing products having a single or double-sided surface coating of loose fibers, and a method for generating microporosity in such products.

In one embodiment of the invention, a method is provided for producing a stretchable workpiece, said method comprising the steps of: (a) applying a wetting agent onto a surface of a wall; (b) applying a first layer of loose fibres onto at least a portion of the surface of the wall to produce at a partially fibre-coated surface; and (c) spraying a liquid product material onto the fibre-coated surface to form a product material layer of predetermined thickness on the fibre-coated surface and produce a stretchable workpiece, wherein the product material layer has an inner and outer surface and the fibres are attached to the inner surface of the product material layer.

In one aspect of this embodiment, the method further comprises the step of applying a second layer of loose fibres onto the outer surface of the product material layer. The loose fibres may be applied directly to the outer surface of the product material layer where the product material layer is wet or has not fully dried. Alternatively, the product material layer may be dried first and then at least one layer of an adhesive or a second product material layer is applied to the product material layer to form an adhesion layer. The loose fibers may then be applied to the adhesion layer. This allows for the formation of products having inner and outer surfaces coated with loose fibres.

In another aspect of this embodiment, the method further comprises the steps of: allowing the product material layer to dry;

In another embodiment, the invention provides a method for producing a stretchable workpiece, said method comprising the steps of: (a) coating a surface of a wall with a gel; (b) applying a first layer of loose fibres onto at least a portion of the surface of the gel coated wall, in a manner that the loose fibres are anchored in said gel and held by the gel at substantially upright position relative to the wall surface (e.g by electrostatic flocking technology) the fibres partially covered by the gel; to produce at least a partially fibre-coated surface; and (c) spraying a liquid product material onto the said substantially upright standing fibres in a manner that the fibres are embedded in the product material droplets network, to form a product material layer on the fibre-coated surface and produce a stretchable workpiece, wherein the product material layer has an inner and outer surface and the fibres are attached to the inner surface of the product material layer at a substantially upright position.

These and other embodiments of the invention will become apparent in light of the detailed description below.

DETAILED DESCRIPTION OF THE INVENTION

Figure 1:
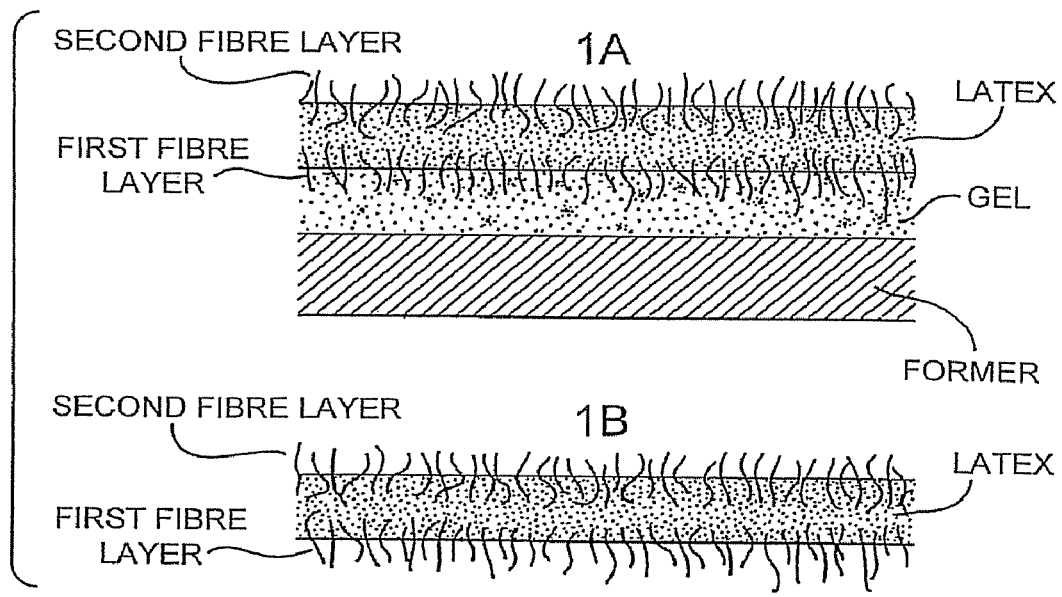
FIG. 1 shows a representative workpiece. In 1A, the workpiece is on a former wherein the first layer of fibres is applied into the wetting agent. In 1B, the workpiece has been displaced from the former and the wetting agent has been removed.
Figure 2:
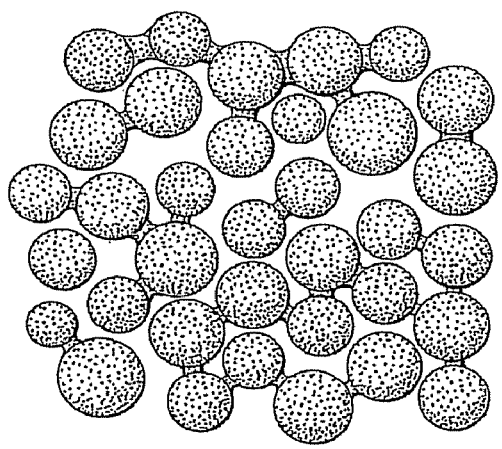
FIG. 2 represents a surface view of the workpiece showing a micro-perforated layer created by the spray droplets.
Figure 3:
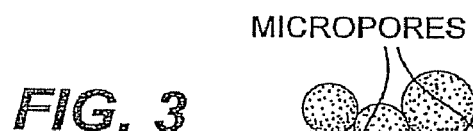
FIG. 3 represents a section of the workpiece showing micropores formed by the network of droplets.
Figure 4:
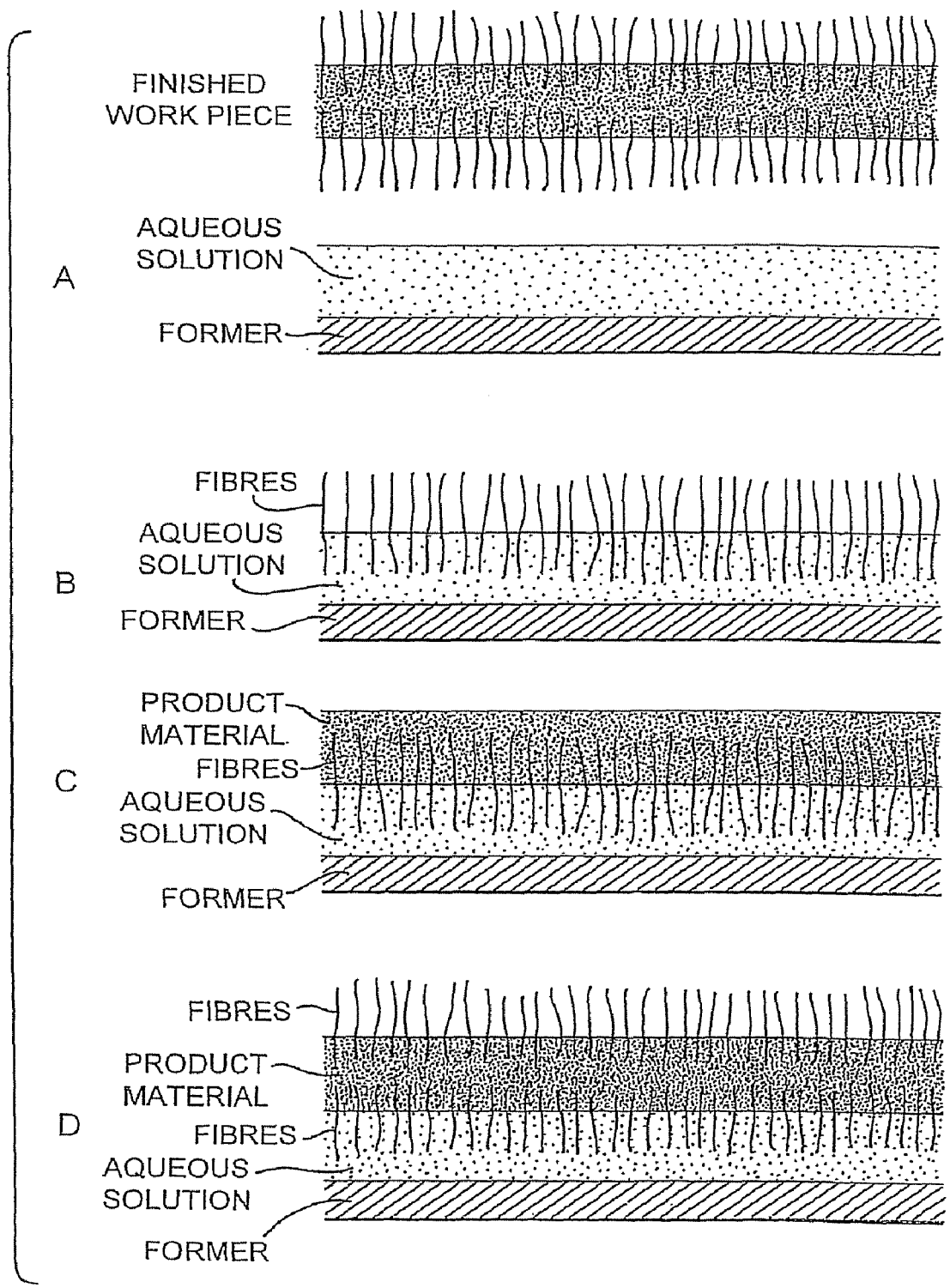
FIG. 4 represents a representative process for preparing a finished workpiece which entails (A) applying an aqueous solution to a former; (B) applying fibres onto the aqueous solution on the former; (C) applying product material over the embedded fibres; and (D) applying fibres on top of the product material.

The present invention is generally related to methods for producing stretchable, elastic or shape-retaining products composed of principal materials comprising resilient elastomers such as natural latex rubber, polyurethane or other synthetic materials, in a spray able liquid state, using a precise controlled spraying of the liquid material onto a surface of a wall such as a workpiece former. The resulting product may have a uniform thickness or different thicknesses at different regions as desired. The present invention is also directed to methods for preparing products having a flocked single or double-sided surface, that is a surface coated with loose fibers, and methods for generating desired porosity in order to gain breathability of such products. The present invention is also directed to products produced by the inventive methods, a workpiece former, and apparatus for preparing products based on product material spraying. The product produced by the invention has an improved cozy feeling on both sides of the product. A textile-like feeling and a 'textile movement noise' is achieved by using the methods and former of the invention.

The term "flock" or "flocking" refers to the process of applying, attaching, or adhering loose fibres onto a surface.

The terms "former," "mould," or "workpiece former" are used interchangeably. A former or mould is an object made of any desired shape or size and serves as shape former for the making of products. For example, if a product in the shape of a face mask is desired, then a former or mould may be constructed that displays the shape and size of desired face mask. The former may be flat and two-dimensional such as a flat belt conveyor. Alternatively, the former may be three-dimensional and have a complex shape to which a workpiece substantially conforms. In addition, the former may be made of any suitable material such as metal (e.g., aluminium), porcelain, ceramic, plastics, or composite (e.g., metal and plastic).

The terms "product" and "workpiece" are used interchangeably and may also include any object that can be produced using the methods, apparatus, and formers of the invention. Stretchable, elastic products have a variety of uses including, without limitation, industrial use such as pipes, seals, membranes sheets, filtering membranes; food industry such as breathable stretchable wrappers or coverings for objects including perishables such as food; medical industry for medical products such as dressings and bandages; sanitation, athletic, and personal hygiene industries such as garments including protective garments and undergarments like brassieres, undershorts, socks, or gloves and any other garment, undergarment or dressing for veterinary or outdoor use. Other examples of garments are described in U.S. Ser. No. 10/723,244, filed Nov. 26, 2003, and in U.S. Ser. No. 09/744,779, filed Aug. 5, 1999, both of which are incorporated by reference in their entirety.

The phrase "loose fibres" refers to any suitable loose flocking fibre material including natural or synthetic materials and may be hydrophilic, hydrophobic, or a combination of the two. Hydrophilic fibers include wettable fibers, i.e., hydrophobic fibers that have been treated. with to render them hydrophilic, absorbent fibers, and superabsorbent polymer fibers. Examples of wettable fibers include bicomponent fibers, polypropylene fibers, and polyester fibers that have been treated for example with surfactants. Example of wettable fibers are polyester fibers, such as DuPont-Akra Polyester Type 11A Bright commercially available from DuPont Company treated with a surfactant such as Tween 20 commercially available from ICI Americas Inc. Absorbent fibers are hydrophilic fibers. Absorbent fibers may comprise rayon fibers, acrylic fibers, nylon fibers, polyvinyl alcohol fibers, and fibers of natural or regenerated cellulosics. Example of absorbent fiber is rayon fibers. Superabsorbent polymer fibers are hydrophilic fibers that are swellable and capable of absorbing greater than about 5 grams per gram (of fiber weight) of 1% saline solution. Examples of superabsorbent polymer fibers are polyacrylate fibers, fibers of grafted cellulose, and fibers of maleic acid. Examples of superabsorbent polymer fibers include OASIS Type 101, commercially available from Technical Absorbents Limited and CAMELOT, commercially available from Camelot, Alberta, Canada. A preferred fibre for use in the invention is cotton fibres. Any suitable method for delivering the loose fibres so that they may be applied to the surface can be used. For instance, the loose fibres can be sprayed or blown onto the surface of the wall as well as electrostatically and or pneumatically flocked.

The phrase "product material" comprises suitable stretchable material such as natural or synthetic polymers. A natural polymer includes, without limitation, latex rubber. A synthetic polymer includes, without limitation, polyurethane. For spraying purposes, emulsions, suspensions, or solutions of the product material, e.g., liquid latex rubber, are generally used. After spraying the product material, with or without additional process steps, the product material is preferably allowed to dry before it is removed from a surface. The drying process may include curing or setting processes, depending on the choice of product material. For example, when latex rubber is used as the product material, the latex rubber would cure as it dries. In practicing this invention, the preferred product material is natural latex rubber which forms durable, flexible, stretchable, elastic shape-retaining products.

The term "wall" may refer to a flat or two-dimensional work piece former such as a flat conveyor belt or any suitable shaped flat surface to which a product substantially conforms. Alternatively, the wall may be a three-dimensional workpiece former having a complex shape to which a workpiece substantially conforms. Alternatively the wall may be non flat, embossed or complex shaped conveyor belt, perforated conveyor belt, or combination thereof. The wall may be made of any suitable materials such as plastic, rubber, composite ((e.g. of metal and plastic or ceramic), ceramics, metal such as aluminum or stainless steel.

Prior to the present invention, the manufacture of products having double flocked surfaces is not easy thing to do. Typically, the outer surface of a product contained on a mould would be initially flocked. To flock the inner surface of the product, the product is generally stripped off the mould and turned inside out so as to expose the unflocked inner surface. Adhesive material is layered onto the unflocked inner surface, then loose fibres are applied to the adhesive layer. Because of additional mechanical removal and adhesive application steps, the process of producing double sided flocked products can be difficult and expensive, particularly when thin products are involved. The present invention provides a surprising and significant improvement of the double sided fibre coating procedures by reducing the number of process steps and entailed costs. Moreover, the present invention provides a surprisingly effective and economical way to produce thin products that are flocked at their inner and outer surfaces.

Thus, the inner surface flocked product can be used to prepare a double sided flocked product and in another embodiment of the invention, the method further comprises the step of applying a second layer of loose fibres onto the outer surface of the product material layer. This allows for the formation of products having double-sided flocked (inner and outer) product material surfaces without the need of mechanical removal of the initially flocked product from the former.

As discussed above, the loose fibres may be applied to the surface of the wall by any suitable means. To allow the loose fibres to temporarily adhere to the surface of the wall prior to applying the product material layer, the surface may be wetted with a suitable medium or wetting agent prior to the application of the loose fibres. Representative wetting agent include an aqueous medium such as water, an aqueous solution (e.g., surfactant solution), or a suspension, (e.g. a gel such as a hydrogel) and a surfactant solution, The wetting agent should not interfere with the flocking procedure or cause any degradation of the product material layer. Upon product material spraying, the loose fibres will stick to the product material layer and result in the generation of an inner flocked layer on sprayed product. The solvent in the wetting agent will dry or evaporate anyway during the drying or curing step of the main product layer, leaving little or no residue. The residue would not interfere with the characteristics of the product such as soft tactile feel. If desired, however, the residue may be removed by any suitable means such as washing or soaking the product in an aqueous solution, e.g., water, to remove or leach out any residue.

In some embodiments of the invention, the wetting agent comprise a solution having less than 5 weight percent of cellulose. In another embodiment, the wetting agent is a gel having more than 95 weight percent of liquid and a small amount of a gelatin base substance, for example gelatin, surfactant, or cellulose. The wetting agent does not react or stain the liquid product material, and can be easily removed from the finished workpiece. The wetting agents of the invention should have such viscosity which holds the fibres in a stable position. For example, the wetting agent may comprise glycerin, hydroxyethyl cellulose, propylene glycol, synthetic or natural polymers, proteins, carbohydrade, sorbitol, polysorbat, acrylamide, methacrylamide, N-alkylene methacrylamide, N-dialkyleneamino-alkylene methacrylamide, N-dialkyleneamino-alkylene methacrylamide, N-methylolmethacrylamide, N-vinylformamide, N-vinyl-acetamide, N-vinyl-N-methyl-acetamide, N-vinyl-N-methyl-formamide, hydroxy-ethyl-acrylate, methacrylic acid-ester of polyethylene-glycol-mono-allyl-ether, or allyl ether of polyethylene-glycol. For example, the wetting agent which can be used in the invention are hydrogels (Hydromer, Inc., Cambridge Polymer Group, and Vitality Medical).

In one embodiment of the invention, a method is provided for producing a stretchable workpiece, said method comprising the steps of: (a) applying a wetting agent onto a surface of a wall; (b) applying a first layer of loose fibres onto at least a portion of the surface of the wall to produce at a partially fibre-coated surface. The loose fibres are flocked electrostatically or by any other suitable way so that they hit the wall substantially perpendicular to its surface; and (c) spraying a liquid product material onto the upright standing fibres to form a product material layer of predetermined thickness on the fibre-coated surface and produce a stretchable workpiece, wherein the product material layer has an inner and outer surface and the fibres are attached to the inner surface of the product material layer. Another embodiment further comprising the step of applying a second layer of loose fibres onto the outer surface of the product material layer, wherein the product material layer is uncured or partially uncured. In another embodiment, the method further comprising the steps of: allowing the product material layer to dry; and removing the stretchable workpiece from the surface. After the workpiece is removed from the surface, the gel can be evaporated so that little gel residue remains on the first layer of fibres. The residue can be subsequently removed or reduced by washing of the product with an aqueous medium, e.g., water.

In one embodiment, the product material layer has different thicknesses at different areas, or the same thickness at different areas. The wall is flat, such as a flat conveyor belt, or the wall is a workpiece former. In another embodiment, the workpiece former comprises a complex shape to which the workpiece substantially conforms. In still another embodiment, the wall comprises a plurality of perforations, and the spraying is carried out such that at least no substantial product material layer forms over the perforations.

In one other embodiment, the fibres are made of natural or synthetic materials, for example, lightweight cotton fibres or viscose fibres or a combination of the two. In another embodiment, the liquid product material comprises a natural or artificial elastomer. A natural elastomer can comprise natural latex rubber, and an artificial elastomer can comprises polyurethane.

In one embodiment of the invention, step (a) comprises applying the wetting agent at a predetermined thickness and viscosity range. In a preferred embodiment, the wetting agent is at a viscosity of about 300 to about 10,000 cps. In another preferred embodiment, the wetting agent is a gel, or a solution comprising less than 5 weight percent of cellulose.

In another embodiment of the invention, step (b) comprises applying the fibres so that fibres penetrate the gel perpendicular to the surface of the wall and the gel holds the fibres in an upright position. In still another embodiment, step (c) comprises spraying the liquid product material on top of the upright fibres to create a web of the sprayed liquid product material on top of the upright fibres. The intensity and drop size of the sprayed liquid product material can be controlled so that the sprayed liquid product material forms a porous layer or a unified and even layer. In one embodiment, the layer is micro-porous.

In some embodiments, the flocking of the fibres onto the wetting agent in the form of a gel foundation is preferably done electrostatically so that the strong movement of the fibres towards the wetted former causes the fibres to move and penetrate the gel at a perpendicular to the former surface, because of the air resistance effect. The fibres will penetrate the gel layer which will hold the fibres upright and will cover a part of each fibre, the part of the fibre that penetrated into the gel.

Spraying liquid product material, such as latex, on top of the upright fibres results in a web-like layer of the sprayed polymer on top of the uncovered, upper side of the upright fibres. Formation of such web-like layer can be efficiently carried out by controlling the intensity of the spray which in turn controls the continuity of the sprayed layer created by the spraying the product material. Such a procedure creates a porous layer, or a micro-porous layer, or a more unified and even layer. The control of spray intensity, droplet size and surface tension of the product material enables controlling the finished product porosity and breathability.

Control of spray intensity can be done for instance by controlling the spray gun movement speed relative to the wall surface, droplet size can be controlled by changing the atomizing air pressure and sprayed material pressure changing the nozzle orifice diameter and changing the spraying liquid viscosity. The surface tension can be controlled by changing the chemical formulation, properties and dilution of the product liquid material The micro-porous or micro-perforated layer is created when droplet size is relatively big and when surface tension is relatively high so that drops do not easily join together, leaving small spaces between them. The small amount of liquid absorbed by the fibres immediately after spraying the product material over the fibres is another reason for the creation of an uneven micro-porous layer.

In one embodiment the creation of the product layer is done in several spraying steps, so that the uneven poroused product material layer is first cured or partly cured, then a second layer is sprayed, in that way surface tension effect of the second layer keeps most of droplets joining the web previously created, enabling the creation of thicker and stronger layer while keeping the microporosity of the work piece.

The wetting agent is preferably aqueous solution that can be applied to the surface of the wall to hold the fibres onto the surface of the wall. In some embodiments, the wetting agent is viscous, for example, having the viscosity of honey or that of a gel material. For example, the viscosity of the wetting agent can be in the region of about 300 to about 10,000 CPS.

The workpiece so formed from the methods comprising a wetting agent that hold the fibres upright on the surface of the former exhibit many surprising and unexpected results that provides a workpiece of superior properties. Use of a thick wetting agent together with the electrostatic flocking technique followed by the controlled droplets spray of the product material layer, has the advantage that the fibres are held in a substantially upright position to produce workpiece surfaces that are uniformly and efficiently coated with fibres on the inner side of the layer, without the fibres being soaked by the product material layer. Since the perpendicular standing fibers penetrated the wetting agent, they are held in the perpendicular position by the wetting agent and are partly covered by the said wetting agent temporary.

When sprayed product material liquid is applied on top of the fibres, the covered part of the fibres is protected from being coated by the said product material liquid, at this stage change of roll is taking place, the product material liquid is taking the roll of keeping the fibres in place, still perpendicular to the surface. At a latter stage, the wetting agent will be washed out or evaporated, reviling the previously covered part of the fibres, which will be now standing free out of the product material layer substantially perpendicular to its surface. This create a smooth and velvet fiber layer that is coating the inner surface of the product layer in a similar way to the external flocked surface, a result that cannot be achieved in any other way.

Further, the upright fibres of the inner layer promote the formation of a breathable workpiece because the upright fibres enhance the formation of pores in the workpiece.

In further another aspect of this embodiment the wall surface is a flat surface.

It will be appreciated by persons skilled in the art of that the present invention is not limited by what has been particularly shown and described hereinabove. Rather the scope of the present invention includes variations and modification of the various features described in the specification and shown in the drawings which may occur to a person of ordinary skill in the art upon reading the foregoing description and which are not in the prior art.

What is claimed is:

1. A stretchable workpiece comprising:
   (a) a porous or micro-porous webbed layer of partially connected droplets of a resilient elastomeric material, the layer having an inner and outer surface; and
   (b) flock fibers partially embedded at least in one surface of the layer.

2. The workpiece according to claim 1, further comprises flock fibers partially embedded in the inner and outer surfaces.

3. The workpiece according to claim 1 or 2, wherein the fibers are made of natural or synthetic material.

4. The workpiece according to claim 1, wherein the resilient elastomeric material comprises a natural or synthetic material.

5. The workpiece according to claim 4, wherein the natural material is latex rubber.

6. The workpiece according to claim 1 or 2, wherein the layer has uniform thickness or different thicknesses at different areas.

7. The workpiece according to claim 1 or 2, wherein the webbed layer is perforated.

* * * * *